(12) United States Patent
Ganesan

(10) Patent No.: US 8,467,789 B2
(45) Date of Patent: *Jun. 18, 2013

(54) TELEPHONE WITH AUTOMATIC SWITCHING BETWEEN CELLULAR AND VOIP NETWORKS

(75) Inventor: Vasudevan Ganesan, Cupertino, CA (US)

(73) Assignee: Vasu Networks Corporation, Cupertino, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/168,585

(22) Filed: Jun. 24, 2011

(65) Prior Publication Data

US 2011/0255416 A1    Oct. 20, 2011

Related U.S. Application Data

(63) Continuation of application No. 11/031,498, filed on Jan. 6, 2005, now Pat. No. 7,991,399.

(60) Provisional application No. 60/534,466, filed on Jan. 6, 2004.

(51) Int. Cl.
*H04W 36/00* (2009.01)

(52) U.S. Cl.
USPC ................................. 455/436; 370/395.65

(58) Field of Classification Search
USPC .............................. 455/436, 435.3, 437, 442
See application file for complete search history.

(56) References Cited

U.S. PATENT DOCUMENTS

| | | | |
|---|---|---|---|
| 6,473,413 B1 | 10/2002 | Chiou et al. | |
| 6,515,983 B1 | 2/2003 | Utas | |
| 6,553,022 B2 | 4/2003 | Hartmaier | |
| 6,584,087 B1 | 6/2003 | Czaja et al. | |
| 6,754,833 B1 | 6/2004 | Black et al. | |
| 6,862,444 B2 | 3/2005 | Karaoguz et al. | |
| 6,996,107 B2 | 2/2006 | Janoska | |
| 7,127,232 B2 | 10/2006 | O'Neil et al. | |
| 7,142,847 B2 | 11/2006 | Umeda et al. | |
| 7,254,119 B2 | 8/2007 | Jiang et al. | |
| 7,382,763 B2 | 6/2008 | Ludwig et al. | |
| 7,512,796 B2 | 3/2009 | Haverinen et al. | |

(Continued)

FOREIGN PATENT DOCUMENTS

| | | |
|---|---|---|
| DE | 20310113 U1 | 1/2004 |
| EP | 0936777 A1 | 8/1999 |

(Continued)

OTHER PUBLICATIONS

3GPP Organization Project, "3rd Generation Partnership Project-;Technical Specification Group Services and System Aspects Service aspects; Handover requirements between UTRAN and GERAN or other radio systems (Release 8)", Mar. 2006, pp. 1-20.

(Continued)

*Primary Examiner* — Tu X Nguyen

(74) *Attorney, Agent, or Firm* — Haverstock & Owens LLP

(57) ABSTRACT

A mobile communication device includes, in part, a cellular communication module, a first antenna adapted to receive and transmit data between the mobile communication module and a cellular network, a Wireless Fidelity (Wi-Fi) communication module, a second antenna adapted to receive and transmit data between the Wi-Fi communication module and a VoIP network, a signal monitoring circuit, and a switching circuit adapted to switch an existing communication from the cellular communication module to the Wi-Fi communication module or vice versa.

16 Claims, 2 Drawing Sheets

U.S. PATENT DOCUMENTS

| | | |
|---|---|---|
| 8,041,360 B2 | 10/2011 | Ibe et al. |
| 2001/0049790 A1 | 12/2001 | Faccin et al. |
| 2002/0078174 A1 | 6/2002 | Sim et al. |
| 2002/0085516 A1 | 7/2002 | Bridgelall |
| 2002/0114305 A1 | 8/2002 | Oyama et al. |
| 2002/0147008 A1 | 10/2002 | Kallio |
| 2002/0150228 A1 | 10/2002 | Umeda et al. |
| 2003/0083079 A1 | 5/2003 | Clark et al. |
| 2003/0086366 A1 | 5/2003 | Branlund et al. |
| 2003/0087629 A1 | 5/2003 | Juitt et al. |
| 2003/0112766 A1 | 6/2003 | Riedel et al. |
| 2003/0185172 A1 | 10/2003 | Rue |
| 2003/0217007 A1 | 11/2003 | Fukushima et al. |
| 2003/0217091 A1 | 11/2003 | Echigo et al. |
| 2003/0224792 A1 | 12/2003 | Verma et al. |
| 2004/0005878 A1 | 1/2004 | Olin et al. |
| 2004/0030791 A1 | 2/2004 | Dorenbosch et al. |
| 2004/0085959 A1 | 5/2004 | Ohkawa |
| 2004/0087307 A1 | 5/2004 | Ibe et al. |
| 2004/0105424 A1 | 6/2004 | Skoczkowski et al. |
| 2004/0114559 A1 | 6/2004 | Wang |
| 2004/0127208 A1 | 7/2004 | Nair et al. |
| 2004/0132427 A1 | 7/2004 | Lee et al. |
| 2004/0137902 A1 | 7/2004 | Chaskar et al. |
| 2004/0174880 A1 | 9/2004 | White et al. |
| 2004/0203666 A1 | 10/2004 | Foster et al. |
| 2004/0203788 A1 | 10/2004 | Fors et al. |
| 2004/0203802 A1 | 10/2004 | McCormick et al. |
| 2004/0218575 A1 | 11/2004 | Ibe et al. |
| 2004/0229618 A1 | 11/2004 | Adatrao et al. |
| 2005/0059400 A1 | 3/2005 | Jagadeesan et al. |
| 2006/0050663 A1 | 3/2006 | Ganesan |
| 2006/0050687 A1 | 3/2006 | Ganesan |
| 2006/0050721 A1 | 3/2006 | Ganesan |
| 2006/0080423 A1 | 4/2006 | Brewer et al. |
| 2006/0121894 A1 | 6/2006 | Ganesan |
| 2006/0146767 A1 | 7/2006 | Moganti |
| 2006/0234678 A1 | 10/2006 | Juitt et al. |
| 2006/0291455 A1 | 12/2006 | Katz et al. |
| 2007/0076665 A1 | 4/2007 | Nair et al. |
| 2007/0112948 A1 | 5/2007 | Uhlik |
| 2007/0249390 A1 | 10/2007 | Purkayastha et al. |
| 2009/0070489 A1 | 3/2009 | Lu et al. |
| 2010/0074228 A1 | 3/2010 | Hicks, III et al. |
| 2011/0010282 A1 | 1/2011 | Olin et al. |

FOREIGN PATENT DOCUMENTS

| | | |
|---|---|---|
| EP | 1471665 A1 | 10/2004 |
| GB | 2287858 A | 9/1995 |
| JP | 200226994 A | 1/2002 |
| JP | 2004320473 A | 11/2004 |
| WO | 03056719 A1 | 7/2003 |
| WO | 2004/013998 A2 | 2/2004 |
| WO | 2004/057903 A1 | 7/2004 |

OTHER PUBLICATIONS

3GPP Organization Project, "3rd Generation Partnership Project; Technical Specification Group Services and System Aspects Service aspects; Service principles (Release 8)", Mar. 2006, pp. 1-45.

3GPP Organization Project, 3rd Generation Partnership Projects;Technical Specification Group Service and System Aspects; Service Requirements for the All-IP Network (AIPN); V8.0.0, Stage 1, (Release 8), p. 1-24.

"Unlicensed Mobile Access (UMA);Protocols (Stage 3)", R1.0.4, May 2, 2005, pp. 1-162.

TELEPHONE WITH AUTOMATIC SWITCHING BETWEEN CELLULAR AND VOIP NETWORKS

CROSS-REFERENCES TO RELATED APPLICATIONS

This patent application is a continuation application of co-pending U.S. patent application Ser. No. 11/031,498, filed on Jan. 6, 2005, and entitled "TELEPHONE WITH AUTOMATIC SWITCHING BETWEEN CELLULAR AND VOIP NETWORKS," which claims benefit under 35 USC 119(e) of the filing date of U.S. provisional application No. 60/534,466, filed on Jan. 6, 2004, entitled "Radiotelephone With Automatic Switching Between Cellular And Wi Fi Networks Using Wi-Fi Signal Strength Values", the content of which is incorporated herein by reference in its entirety.

BACKGROUND OF THE INVENTION

A small portion of the radio frequency (RF) spectrum is assigned to each communications carrier. The assigned spectrum, therefore, must be used efficiently in order to allow the maximum number of frequency users to have access to this spectrum. Multiple access modulation techniques have been developed to provide optimum utilizing of the RF spectrum. Examples of such modulation techniques include time division multiple access (TDMA), frequency division multiple access (FDMA), and code division multiple access (CDMA).

There is a wide variance in the performance of wireless networks. A conventional wireless cellular network, covers a relatively large geographical area but provides a relatively low bandwidth. Such wireless networks use regulated portions of the radio spectrum and are shared by many users. The infrastructure costs of wireless networks are relatively high due to the size and complexity of the cellular network equipment.

Other wireless networks, such as CDMA2000-EV-DO/DV networks, offer higher bandwidth and enhanced data services, such as web browsing. However, these networks also pack many users into a relatively small portion of the regulated spectrum. Other types of radio networks are adapted to improve spectral efficiency with increased and smaller coverage areas. For example, an IEEE 802.11x (or Wi-Fi) network may transmit at speeds up to 11 Mbps using a Direct Sequence Spread Spectrum (DSSS) mode or at speeds up to 54 Mbps using an Orthogonal Frequency Division Multiplexing (OFDM) mode.

An access point conforming to an IEEE 802.11x (e.g., IEEE 802.11b) network may cover an area of a few hundred feet in diameter. Each such access point is connected to a larger network (e.g., Internet). In order to cover larger geographical areas, a relatively large number of IEEE 802.11x network access points and a relatively large wire-line back haul networks are required. In part, due to the back haul costs, the resulting IEEE 802.11x based network may thus be more expensive to set up and operate than a similarly based wireless network. In other words, many tradeoffs often exist between and among the coverage areas, the maximum bit-rates, and the costs associated with different types of wireless networks.

Demand for high bandwidth and quality of service (QoS) associated with mobile communication devices with full roaming capability is on the rise. One known communication device includes a cellular communication module adapted to enable communication using wireless cellular networks as well as a Wi-Fi communication module adapted to enable communication using a Voice over IP (VoIP) protocol. In such devices, to change the communication mode from cellular to VoIP or vice versa, the user has to manually change the device's setting by, e.g., pressing one ore more keys.

In yet other communication devices known to be under development, to switch the communication mode from, for example, cellular to VoIP, the cellular network first detects the position of the mobile communication device to determine whether the mobile communication device is in a Wi-Fi area. If it so detects, the cellular network sends a switching signal to the mobile communication device to enable the communication to continue the communication using the VoIP protocol. However, obtaining and maintaining accurate position of many mobile communication devices concurrently poses a challenging task. Consequently, in such systems, the switching of the call from cellular to VoIP or vice versa may result in the loss of the call.

BRIEF SUMMARY OF THE INVENTION

In accordance with the present invention, a mobile communication device is configured so as to automatically switch a communication that is already in progress using a wireless cellular network (hereinafter alternatively referred to as cellular network) to a wireless Voice over IP (VoIP) network or vice versa. The mobile communication devices is adapted to include, in part, a cellular communication module, a first antenna adapted to receive and transmit data between the mobile communication module and a cellular network, a Wireless Fidelity (Wi-Fi) communication module, a second antenna adapted to receive and transmit data between the Wi-Fi communication module and a VoIP network, a signal monitoring circuit, and a switching circuit adapted to switch an existing in-progress communication between the cellular communication module and the Wi-Fi communication module. The second antenna and associated circuitry are maintained in on-states continuously to monitor and detect Wi-Fi signals.

If the mobile communication device is in an in-progress (i.e., pre-established) communication via its cellular communication module and through a cellular network, and the Wi-Fi antenna system detects a Wi-Fi signal having a first predefined level (strength), a timer disposed in the mobile communication device is activated to establish a first time window of a first predefined size. If the Wi-Fi signal level detected during the first time window remains equal to or greater than the first predefined level, at the expiration of the first time window, the switching circuit causes the in-progress communication to be switched from its cellular communication module to its Wi-Fi communication module and through a VoIP network without losing the in-progress communication.

In some embodiments, upon activating the timer, the Wi-Fi communication module is caused to change state from a sleep mode, during which the Wi-Fi communication module consumes relatively small amount of power, to a stand-by mode during which the Wi-Fi communication module consumes an intermediate amount of power. Subsequently, before the communication is switched to the Wi-Fi communication module, the Wi-Fi communication module is caused to be placed in a full active mode, during which the Wi-Fi communication module consumes an amount of power larger than the intermediate amount of power.

If the mobile communication device is in a pre-established communication via its Wi-Fi communication module and through a VoIP network, and the Wi-Fi antenna system detects that the level of the received Wi-Fi signal is below a second predefined value, the timer is activated to establish a second time window of a second predefine size. If the Wi-Fi signal level detected during the second time window is equal to or greater than a third predefined value, the pre-established communication via the Wi-Fi communication module is maintained without any change. If the Wi-Fi signal level detected during the second time window is less than the third predefined value, the timer is reset and reactivated to establish a third time window of a third size. If the Wi-Fi signal level detected during the third time window is less than the third predefined value, at the expiration of the third time window, the switching circuit causes the in-progress communication to be switched from its Wi-Fi communication module to its cellular communication module and through a cellular network without losing the in-progress communication.

In some embodiments, upon activating the timer to establish the second time window, the cellular communication module is caused to change state from a sleep mode, during which the cellular communication module consumes relatively small amount of power, to a stand-by mode during which the cellular communication module consumes an intermediate amount of power. Subsequently, before the communication is switched to the Wi-Fi communication module, the cellular communication module is caused to be placed in a full active mode, during which the cellular communication module consumes an amount of power larger than the intermediate amount of power.

In some embodiments, the Wi-Fi communication module is adapted to communicate with an access point of a Wi-Fi local are network using an 802.11x wireless protocol, and the cellular communication module is adapted to communicate with a base station of a wireless cellular network using any one of GSM, CDMA, or CDMA2000 protocols.

DETAILED DESCRIPTION OF THE INVENTION

Figure 1:
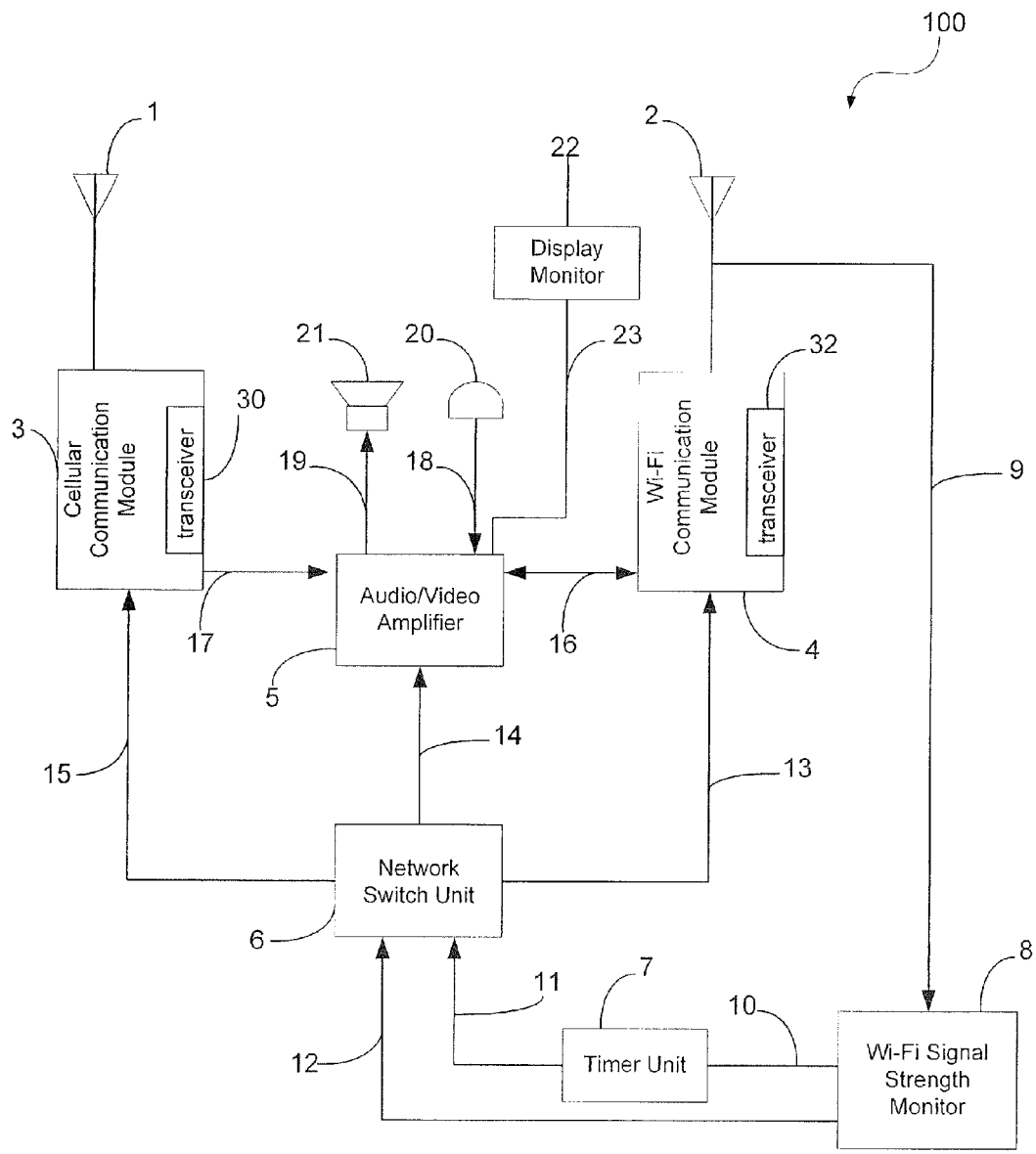
FIG. 1 is a simplified high-level block diagram of a mobile communication device, in accordance with one embodiment of the present invention.

In accordance with the present invention, a mobile communication device is configured so as to automatically switch an existing communication from a wireless cellular network (hereinafter alternatively referred to as cellular network) to a wireless Voice over IP (VoIP) network, or to switch an existing communication from a VoIP network to a cellular network. It is understood that the Wireless Fidelity (Wi-Fi) signals, as defined, for example, in IEEE 802.11x standards or other equivalent standards may be used to communicate with a Voice over IP (VoIP) network. The mobile communication device is adapted to include, in part, a cellular communication module, a first antenna adapted to receive and transmit data between the mobile communication module and a cellular network, a Wi-Fi communication module, a second antenna adapted to receive and transmit data between the Wi-Fi communication module and a VoIP network, a signal monitoring circuit, and a switching circuit adapted to switch an existing in-progress communication between the cellular communication module and the Wi-Fi communication module. The second antenna and associated circuitry are maintained in on-states continuously to monitor and detect Wi-Fi signals.

It is understood the wireless cellular network includes, in part, a multitude of base stations. Each such base station is adapted to communicate with the mobile communication device when the mobile communication device is located within the coverage area of the base station via RF signals carried over cellular network. It is also understood that each such coverage area is defined by an area centered at the base station and having a radius of, e.g., several miles. It is further understood that a Wi-Fi network may include, in part, a multitude of access points. Each such access point is adapted to communicate with the mobile communication device, when the mobile communication device is located within the coverage area of the access point, via VoIP packets. It is also understood that the mobile communication device may also include blocks adapted for computation and thus be a communication/computation device.

If the mobile communication device is in an in-progress (i.e., pre-established) communication via its cellular communication module and through a cellular network, and the Wi-Fi antenna system detects a Wi-Fi signal having a first predefined level (strength), a timer disposed in the mobile communication device is activated to establish a first time window of a first predefined size. If the Wi-Fi signal level detected during the first time window remains equal to or greater than the first predefined level, at the expiration of the first time window, the switching circuit causes the in-progress communication to be switched from its cellular communication module to its Wi-Fi communication module and through a VoIP network without losing the in-progress communication.

in some embodiments, upon activating the timer, the Wi-Fi communication module is caused to change state from a sleep mode, during which the Wi-Fi communication module consumes relatively small amount of power, to a stand-by mode during which the Wi-Fi communication module consumes an intermediate amount of power. Subsequently, before the communication is switched to the Wi-Fi communication module, the Wi-Fi communication module is caused to be placed in a full active mode, during which the Wi-Fi communication module consumes an amount of power larger than the intermediate amount of power.

If the mobile communication device is in a pre-established communication via its Wi-Fi communication module and through a VoIP network, and the Wi-Fi antenna system detects that the level of the received Wi-Fi signal is below a second predefined value, the timer is activated to establish a second time window of a second predefine size. If the Wi-Fi signal level detected during the second time window is equal to or greater than a third predefined value, the pre-established communication via the Wi-Fi communication module is maintained without any change. If the Wi-Fi signal level detected during the second time window is less than the third predefined value, the timer is reset and reactivated to establish a third time window of a third size. If the Wi-Fi signal level detected during the third time window is less than the third predefined value, at the expiration of the third time window, the switching circuit causes the in-progress communication to be switched from its Wi-Fi communication module to its cellular communication module and through a cellular network without losing the in-progress communication.

In some embodiments, upon activating the timer to establish the second time window, the cellular communication module is caused to change state from a sleep mode, during which the cellular communication module consumes relatively small amount of power, to a stand-by mode during which the cellular communication module consumes an intermediate amount of power. Subsequently, before the communication is switched to the Wi-Fi communication module, the cellular communication module is caused to be placed in a full active mode, during which the cellular communication module consumes an amount of power larger than the intermediate amount of power.

FIG. 1 is a simplified high-level block diagram of a mobile communication device 100, in accordance with one embodiment of the present invention. Mobile communication device 100, which is adapted to automatically switch communication between cellular and VoIP networks, is shown as including, in part, a cellular communication module (hereinafter alternatively referred to as cellular module) 3 coupled to a cellular antenna 1, a Wi-Fi communication module (hereinafter alternatively referred to as Wi-Fi module) 4 coupled to a Wi-Fi antenna 2, an audio/video amplifier 5, a network switch unit 6, a timer unit 7, a Wi-Fi signal level monitor 8, a microphone 20, a speaker 21, and a display monitor 22. Mobile communication device 100 is adapted to establish and maintain communication via either a cellular module 3, through a wireless network (not shown), and/or via Wi-Fi module 4, through a VoIP network (not shown). Cellular module 3 further includes a transceiver 30 adapted to transmit signal to and receive signal from a cellular network. Wi-Fi module 4 further includes a transceiver 32 adapted to transmit signal to and receive signal from a VoIP network. Depending on the level of detected Wi-Fi signal emitted from a Wi-Fi access point, a call initially established via cellular module 3 may be switched to be handle by Wi-Fi module 4, or a call initially established via Wi-Fi module 4 may be switched to be handled by cellular module 3.

Assume that mobile communication device 100 is in communications with a cellular network and is entering the coverage area of a Wi-Fi access point adapted to transmit and receive Wi-Fi signals. As is known, a Wi-Fi access point may be used to gain access to a VoIP network. Wi-Fi antenna 2 together with Wi-Fi module 4 and Wi-Fi signal monitor 8 continuously monitor for to detect Wi-Fi signals. If a detected Wi-Fi signal level is greater than a predefined threshold value $V_{th1}$, Wi-Fi signal level monitor 8 activates timer 7 via signal line 10 and sends a wake-up signal to network switch unit 6 via signal line 12, thereby to change the state of network switch unit 6 from a sleep mode, during which network switch unit consumes relatively small power, to a stand-by mode, during which network switch unit consumes an intermediate amount of power. Network switch unit 6, in turn, supplies wake-up switching signals to cellular module 3 via signal line 15 and to Wi-Fi module 4 via signal line 13. This causes phone cellular module 3 and Wi-Fi module 4 to activate their respective switching modules. The detected Wi-Fi signal level may be determined, for example, by taking multiple samples of the incoming Wi-Fi signal(s) and computing a signal level from these samples. In one embodiment, an average of the amplitudes/phases of the sampled signals may be used to detect the Wi-Fi signal level.

Figure 2:
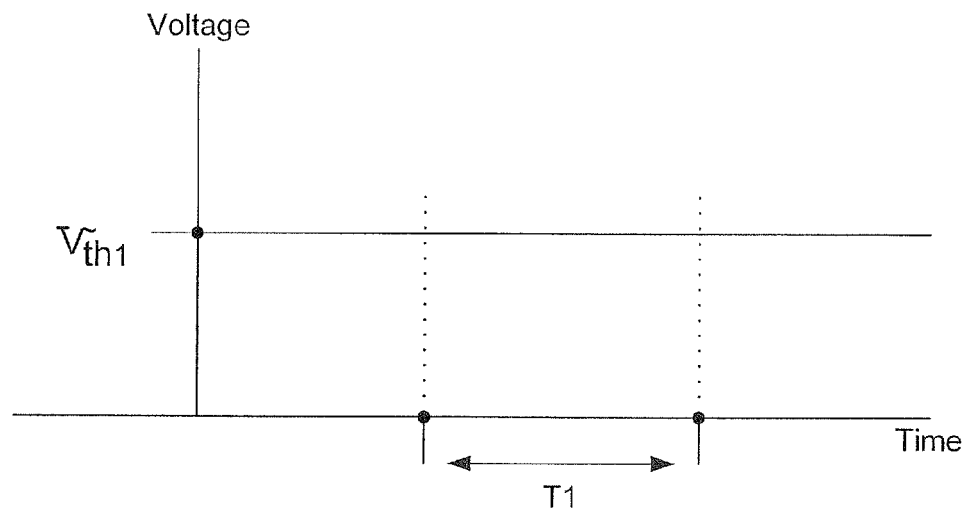
FIG. 2 shows Wi-Fi signal threshold level and timing window used to determine whether to switch a communication from the cellular communication module to the Wi-Fi communication module of the communication device of FIG. 1, in accordance with one embodiment.

If the detected Wi-Fi signal level is greater than $V_{th1}$, timer unit 7 is activated to establish a first time window of a first predefined size $T_1$, as shown in FIG. 2. During time window $T_1$, Wi-Fi antenna 2 together with Wi-Fi module 4 and Wi-Fi signal monitor 8 continue to monitor and detect the level of received Wi-Fi signal. If the Wi-Fi signal level detected during time window $T_1$ remains equal to or greater than $V_{th1}$, at the expiration of time window $T_1$, timer unit 7 sends a cellular tear-down signal and a Wi-Fi link-up signal to the network switch unit 6 via signal line 11. In response, network switch unit 6 sends the tear-down signal to cellular module 3 via signal line 15, and sends the link-up signal to Wi-Fi module 4 via signal line 13. Network switch unit 6 also instructs audio/video amplifier 5, via signal line 14, to generate an audio/video alert signal. The generated audio alter signal is subsequently reproduced by speaker 21 via signal line 18, and the generated video alert signal is subsequently reproduced by display monitor 22 via signal line 23. The audio/video alert tones are adapted to notify the mobile communication device user of a network switch from cellular to Wi-Fi.

Cellular module 3 is adapted to terminate connection to the cellular network and to switch off connection to audio/video amplifier 5 after receiving the tear-down signal. Wi-Fi module 4 is adapted to activate connection to VoIP network and to switch on connection to audio/video amplifier 5—for passing voice signal to audio amplifier 5 and video signal to display monitor 22—after receiving a Wi-Fi link-up signal. The previously established communication link is thus continued uninterrupted via the VoIP network and through loudspeaker 21, microphone 20 and display monitor 23.

Assume that mobile communication device 100 is in communications with a VoIP network and may be leaving the coverage area of the Wi-Fi access point. Wi-Fi antenna 2 together with Wi-Fi module 4 and Wi-Fi signal monitor 8 continuously monitor for to detect Wi-Fi signals. If the detected Wi-Fi signal level falls below a second predefined threshold value $V_{th2}$, Wi-Fi signal level monitor 8 activates timer 7 and sends a wake-up signal to network switch unit 6 to change the state of network switch unit 6 from the sleep mode to stand-by mode. Network switch unit 6, in turn, supplies wake-up switching signals to cellular module 3 and to Wi-Fi module 4 to enable these modules to activate their respective switching procedures.

Figure 3:
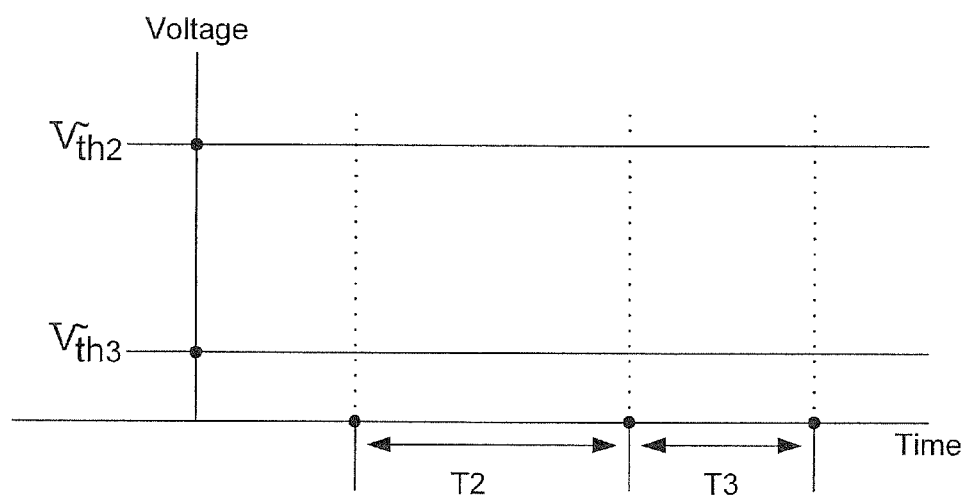
FIG. 3 shows Wi-Fi signal threshold levels and timing windows used to determine whether to switch a communication from the Wi-Fi communication module to the cellular communication module of the communication device of FIG. 1, in accordance with one embodiment.

Once activated, timer unit 7 establishes a second time window of a second predefined size $T_2$, as shown in FIG. 3. During time window $T_2$, Wi-Fi antenna 2 together with Wi-Fi module 4 and Wi-Fi signal monitor 8 continue to monitor and detect the level of received Wi-Fi signal. If the Wi-Fi signal level detected during time window $T_2$ is equal to or greater than a third predefined threshold value $V_{th3}$, where $V_{th3}$ is smaller than $V_{th2}$, the previously established VoIP communication continues without switching.

If the Wi-Fi signal level detected during time window $T_2$ is smaller than $V_{th3}$, at the expiration of time window $T_2$, timer unit 7 is reset and activated to establishes a third time window of a third predefined size $T_3$, where $T_3$ is smaller than $T_2$. If the Wi-Fi signal level detected during time window $T_3$ is equal to or greater than $V_{th3}$, the previously established VoIP communication continues without switching.

If the Wi-Fi signal level detected during time window $T_3$ is less than $V_{th3}$, at the expiration of time window $T_3$, timer unit 7 sends a Wi-Fi tear-down signal and a cellular link-up signal to network switch unit 6. In response, network switch unit 6 sends the tear-down signal to Wi-Fi module 3, and sends the link-up signal to cellular module 4. Network switch unit 6 also instructs audio/video amplifier 5 to generate an audio/video alert signals. The generated audio alter signals is subsequently reproduced by speaker 21, and the generated video alert signal is subsequently reproduced by display monitor 22. The audio/video alert tones are adapted to notify the mobile communication device user of a network switch from Wi-Fi to cellular Wi-Fi module 4 is adapted to terminate connection to the VoIP network and to switch off connection to audio/video amplifier 5 after receiving the tear-down signal. Cellular module 4 is adapted to activate connection to the cellular network and to switch on connection to audio/video amplifier 5 after receiving a Wi-Fi link-up signal. The previously established communication link is thus continued uninterrupted and through loudspeaker 21, microphone 20 and display monitor 23.

In accordance with some embodiments, if the mobile communication device detects both an Wi-Fi signal from an access point and a cellular signal from a mobile cellular base station before establishing a communication link, the mobile communication device first attempts to establish communication with the Wi-Fi access point using Wi-Fi module 4.

The above embodiments of the present invention are illustrative and not limiting. Various alternatives and equivalents are possible. It is understood that the functionality associated with any blocks described above may be centralized or distributed, whether locally or remotely. It is also understood that one or more blocks of each mobile communication device may be performed by hardware, firmware or software, or some combinations thereof. The invention is not limited by the type of cellular network, e.g., CDMA, GSM, otherwise used to carry communication. Nor is the invention limited by the VoIP network. The invention is not limited by the Wi-Fi signals, such as those defined by IEEE 802.11x, where x may be a, b, g, or WiMAX used to carry VoIP communication. The invention is not limited by the type of integrated circuit(s) in which the present invention may be disposed. Nor is the invention limited to any specific type of process technology, e.g., CMOS, Bipolar, or BICMOS that may be used to manufacture the present invention. Other additions, subtractions or modifications are obvious in view of the present invention and are intended to fall within the scope of the appended claims.

What is claimed is:

1. A mobile communication device comprising:
    a cellular communication module adapted to communicate with a wireless cellular network;
    a Wi-Fi communication module adapted to communicate with an access point associated with a Wi-Fi network using a VoIP protocol;
    a switching circuit adapted to automatically switch operation between the cellular communication module and the Wi-Fi communication module;
    a timer; and
    a Wi-Fi signal monitor; wherein if the Wi-Fi signal monitor detects that a level of a Wi-Fi signal is greater than a first predefined threshold value $V_{th1}$, the timer is activated to begin a first time window of a first predefined size $T_1$, wherein if during $T_1$ the Wi-Fi signal monitor detects that the level of the Wi-Fi signal remains equal to or greater than $V_{th1}$, at the expiration of the first time window the switching circuit sends a tear-down signal to the cellular communication module and a link-up signal to the Wi-Fi communication module, wherein said tear-down signal causes the cellular communication module to discontinue handling a previously established cellular communication and wherein said link-up signal causes the Wi-Fi communication module to handle the previously established cellular communication via a VoIP network, and further wherein if during $T_1$ the Wi-Fi signal monitor detects that the level of the Wi-Fi signal does not remain equal to or greater than $V_{th1}$, at the expiration of the first time window the switching circuit does not send the tear-down signal to the cellular communication module and the link-up signal to the Wi-Fi communication module;
    wherein if the mobile communication device detects both a Wi-Fi signal from the access point and a cellular signal from the wireless cellular network before establishing a communication link, the mobile communication device attempts to establish communication with the access point before attempting to establish communication with the wireless cellular network.

2. The mobile communication device of claim 1 wherein said wireless cellular network is selected from a group consisting of GSM, CDMA, and CDMA2000 wireless cellular networks.

3. The mobile communication device of claim 2 wherein said Wi-Fi network is selected from a group consisting of an IEEE 802.11x, Wi-Fi, and WiMAX networks.

4. The mobile communication device of claim 1 wherein the level of the Wi-Fi signal is defined by a plurality of samples of the received Wi-Fi signal.

5. The mobile communication device of claim 1 wherein each of said first and second Wi-Fi signal levels is defined by a respective average of a plurality of samples of received Wi-Fi signal.

6. The mobile communication device of claim 1 wherein only one of the cellular and Wi-Fi communication modules is connected to the wireless cellular network or the WiFi network unless the switching circuit is in the process of switching operation between the cellular communication module and the Wi-Fi communication module.

7. The mobile communication device of claim 1 wherein the tear-down signal to the cellular communication module is a local signal within the mobile communication device.

8. A method comprising:
    detecting a first Wi-Fi signal level;
    activating a timer to establish a first time window of a first predefined size $T_1$ if the detected first Wi-Fi signal level is greater than a first predefined threshold value $V_{th1}$;
    detecting a second Wi-Fi signal level during the first time window; and
    automatically switching a communication in progress via a cellular wireless network to a communication via a VoIP network if the second detected Wi-Fi signal level remains greater than $V_{th1}$; and
    refraining from automatically switching the communication in progress via the cellular wireless network to the communication via the VoIP network if during $T_1$ the Wi-Fi signal monitor detects that the level of the Wi-Fi signal does not remain equal to or greater than $V_{th1}$.

9. The method of claim 8 wherein said wireless cellular network is selected from a group consisting of GSM, CDMA, and CDMA2000 wireless cellular networks.

10. The method of claim 8 wherein said VoIP network is in communication with a network selected from a group consisting of an IEEE 802.11x, Wi-Fi and WiMAX networks.

11. The method of claim 8 wherein each of said first and second Wi-Fi signal levels is defined by a respective plurality of samples of received Wi-Fi signal.

12. The method of claim 8 further comprising:
    sending a tear down signal from a switching circuit to a cellular communication module and a link-up signal from the switching circuit to a Wi-Fi communication module, wherein the switching circuit, the cellular communication module, and the Wi-Fi communication module are comprised within a single mobile communication device.

13. A mobile communication device comprising:
    a cellular communication module to communicate with a wireless cellular network;
    a Wi-Fi communication module to communicate with an access point associated with a Wi-Fi network using a VoIP protocol;

a Wi-Fi signal monitor;
a timer that is activated if the Wi-Fi signal monitor detects a Wi-Fi signal level greater than a first predefined threshold value $V_{th1}$; and
a switching circuit that executes a handoff between the cellular communication module and the Wi-Fi communication module at the expiration of a time window $T_1$ if the Wi-Fi signal monitor detects a second Wi-Fi signal level equal to or greater than $V_{th1}$ during the time window $T_1$, wherein if during the time window $T_1$ the Wi-Fi signal monitor detects that the level of the Wi-Fi signal does not remain equal to or greater than $V_{th1}$, at the expiration of the time window $T_1$ the switching circuit does not execute the handoff between the cellular communication module and the Wi-Fi communication module.

14. A mobile communication device comprising:
a cellular communication module adapted to communicate with a wireless cellular network;
a Wi-Fi communication module adapted to communicate with an access point associated with a Wi-Fi network using a VoIP protocol;
a switching circuit adapted to automatically switch operation between the cellular communication module and the Wi-Fi communication module;
a timer; and
a Wi-Fi signal monitor; wherein if the Wi-Fi signal monitor detects that a level of a Wi-Fi signal is greater than a first predefined threshold value $V_{th1}$, the timer is activated to begin a first time window of a first predefined size $T_1$, wherein if during $T_1$ the Wi-Fi signal monitor detects that the level of the Wi-Fi signal remains equal to or greater than $V_{th1}$, at the expiration of the first time window the switching circuit sends a tear-down signal to the cellular communication module and a link-up signal to the Wi-Fi communication module, wherein said tear-down signal causes the cellular communication module to discontinue handling a previously established cellular communication and wherein said link-up signal causes the Wi-Fi communication module to handle the previously established cellular communication via a VoIP network,
wherein if the mobile communication device detects both a Wi-Fi signal from the access point and a cellular signal from the wireless cellular network before establishing a communication link, the mobile communication device attempts to establish communication with the access point before attempting to establish communication with the wireless cellular network, wherein the timer begins a second time window only if the first time window has expired and the Wi-Fi signal monitor detects that the level of the Wi-Fi signal is greater than the first predefined threshold value $V_{th1}$.

15. A mobile communication device comprising:
a cellular communication module to communicate with a wireless cellular network;
a Wi-Fi communication module to communicate with an access point associated with a Wi-Fi network using a VoIP protocol;
a Wi-Fi signal monitor;
a timer that activates a first time window $T_1$ if the Wi-Fi signal monitor detects a Wi-Fi signal level greater than a first predefined threshold value $V_{th1}$; and
a switching circuit that executes a handoff between the cellular communication module and the Wi-Fi communication module at the expiration of the first time window $T_1$ if the Wi-Fi signal monitor detects a second Wi-Fi signal level equal to or greater than $V_{th1}$ during the first time window $T_1$ wherein the timer begins a second time window $T_2$ only if the first time window $T_1$ has expired and the Wi-Fi signal monitor detects that the level of the Wi-Fi signal is greater than the first predefined threshold value $V_{th1}$.

16. A method comprising:
detecting a first Wi-Fi signal level;
activating a timer to establish a first time window of a first predefined size $T_1$ if the
detected first Wi-Fi signal level is greater than a first predefined threshold value $V_{th1}$;
detecting a second Wi-Fi signal level during the first time window $T_1$;
automatically switching a communication in progress via a cellular wireless network to a communication via a VoIP network if the second detected Wi-Fi signal level remains greater than $V_{th\ 1}$; and
activating the timer to establish a second time window of a second predefined size $T_2$ only if the first time window $T_1$ has expired and the Wi-Fi signal monitor detect a third Wi-Fi signal level that is greater than the first predefined threshold value $V_{th1}$.

* * * * *